(12) United States Patent
Wang

(10) Patent No.: US 12,187,499 B2
(45) Date of Patent: Jan. 7, 2025

(54) SELF-ADAPTIVE AIR BAG BLOCKING DEVICE

(71) Applicant: Kun-Wang Wang, Tainan (TW)

(72) Inventor: Kun-Wang Wang, Tainan (TW)

( * ) Notice: Subject to any disclaimer, the term of this patent is extended or adjusted under 35 U.S.C. 154(b) by 257 days.

(21) Appl. No.: 17/719,923

(22) Filed: Apr. 13, 2022

(65) Prior Publication Data

US 2022/0363213 A1 Nov. 17, 2022

(30) Foreign Application Priority Data

May 14, 2021 (TW) .................................. 110117484

(51) Int. Cl.
*B60R 21/217* (2011.01)
*B60R 21/261* (2011.01)
(Continued)

(52) U.S. Cl.
CPC ............ *B65D 45/32* (2013.01); *B60R 21/261* (2013.01); *B60T 17/222* (2013.01); *B65D 45/16* (2013.01);
(Continued)

(58) Field of Classification Search
CPC ........ B65D 45/32; B65D 45/16; B65D 47/06; B60R 21/261; B60R 2021/162;
(Continued)

(56) References Cited

U.S. PATENT DOCUMENTS 1,506,418 A * 8/1924 Evensta ..................... F16K 7/10
138/93

2,299,116 A * 10/1942 Svirsky ................. F16L 55/134
138/90
(Continued)

FOREIGN PATENT DOCUMENTS

| CN | 208619936 U | * | 3/2019 | |
| CN | 111520568 A | * | 8/2020 | .............. F16L 55/12 |
| JP | 6193106 B2 | * | 9/2017 | |

OTHER PUBLICATIONS

CN-208619936-U English Translation of Specification (Year: 2024).*
JP-6193106-B2 English Translation of Specification (Year: 2024).*
CN-111520568-A English Translation of Specification (Year: 2024).*
JP-6193106-B2 English Translation of Specification (Year: 2024).*
CN-111520568-A English Translation of Specification (Year: 2024).*

*Primary Examiner* — Kenneth Rinehart
*Assistant Examiner* — Stephanie A Shrieves
(74) *Attorney, Agent, or Firm* — Egbert, McDaniel & Swartz, PLLC

(57) ABSTRACT

A self-adaptive air bag blocking device is disclosed. The device includes an air bag, a first gas conveying pipe and a second gas conveying pipe, wherein an air chamber is formed in the air bag, a ring-shaped abutting surface is formed on the peripheral side of the air bag, so that the abutting surface abuts against a mouth of a container. The first gas conveying pipe is communicated with the air chamber and the outer part of the air bag, so that air enters the air chamber to enable the air bag to expand. The abutting surface is elastically deformed and tightly abuts against the inner wall of the container to form air-tight abutment, and the second gas conveying pipe is arranged on the air bag, so that air enters the container through the second gas conveying pipe, and thus the working liquid is discharged.

7 Claims, 7 Drawing Sheets

(51) Int. Cl.
*B60T 17/22* (2006.01)
*B65D 45/16* (2006.01)
*B65D 45/32* (2006.01)
*B65D 47/06* (2006.01)
*B60R 21/16* (2006.01)

(52) U.S. Cl.
CPC ........ *B65D 47/06* (2013.01); *B60R 2021/162* (2013.01); *B60R 2021/2612* (2013.01)

(58) Field of Classification Search
CPC .......... B60R 2021/2612; B60T 17/222; F16L 55/134; B67D 7/54
USPC ................................................ 141/363, 287
See application file for complete search history.

(56) References Cited

U.S. PATENT DOCUMENTS

| | | | | |
|---|---|---|---|---|
| 2,991,916 | A * | 7/1961 | Kish | ...................... B67D 1/045 |
| | | | | 222/400.7 |
| 4,185,806 | A * | 1/1980 | Dremann | .................. F16K 7/10 |
| | | | | 166/321 |
| 4,825,913 | A * | 5/1989 | Stott | ...................... B65B 39/04 |
| | | | | 141/93 |
| 5,353,842 | A * | 10/1994 | Lundman | .............. F16L 55/134 |
| | | | | 138/93 |
| 6,298,961 | B1 * | 10/2001 | Hageman | ................ B60T 11/26 |
| | | | | 220/721 |
| 2015/0177092 | A1 * | 6/2015 | Parker | .................. G01M 3/022 |
| | | | | 73/40.7 |
| 2021/0300315 | A1 * | 9/2021 | Liu | ...................... B60T 17/222 |

* cited by examiner

SELF-ADAPTIVE AIR BAG BLOCKING DEVICE

CROSS-REFERENCE TO RELATED U.S. APPLICATIONS

Not applicable.

BACKGROUND OF THE INVENTION

1. Field of the Invention

The present invention relates generally to a tool for replacing the working liquid of vehicles, and more particularly to a self-adaptive air bag blocking device. The self-adaptive air bag blocking device can be configured on the container of the working liquid.

2. Description of Related Art Including Information Disclosed Under 37 CFR 1.97 And 37 CFR 1.98

A working liquid (such as brake oil or cooling water) is a liquid applied in a vehicle for executing various operations. The vehicle is provided with a container to hold the working liquid. The container has a mouth and a fluid outlet. The mouth is used to fill the working liquid into the container. The fluid outlet is connected to specific components of the vehicle through one or more pipes. The mouth is provided with a cover. When maintenance is required, the cover can be removed to discharge or fill the working liquid.

The blocking device is a tool used for discharging the working liquid. A conventional blocking device is mainly a chock made of an elastic material. The outer diameter of the chock is slightly larger than the caliber of the mouth. The chock is provided with a through channel. When it is needed to discharge the working liquid, firstly remove the cover, and put the chock in the mouth, and squeeze the chock toward the inside of the container, so that the chock is tightly pressed against the inner edge of mouth. Then, air can be pumped into the container through the channel. The air will apply a pressure on the working liquid, and the working liquid will be discharged through the can go through the mouth and the pipe.

Different manufacturers produce different types of vehicles with various specifications. Accordingly, the containers also have different shapes and specifications. Due to different calibers of the mouth, the outer diameter of the chock must match the caliber of the mouth. For this reason, vehicle maintenance staff must be provided with blocking devices of various specifications for different containers.

To prevent air from leaking through the gap between the chock and the inner edge of the mouth and enable effective discharge of the working liquid through the pressure of the air, the chock must be pressed tightly against the inner edge of the mouth. When squeezing the chock to block the mouth or remove the chock from the mouth, a friction is formed between the periphery of the chock and the container. The fitting or removal of the chock can be difficult. Also, the periphery of the chock may be worn out or a contraction may occur due to the friction. This will consequently affect the service life of the chock. In case of improper operation, and the chock is squeezed excessively, the chock will over-press the mouth to cause a deformation, leading to reduced service life of the container.

Another existing type of blocking device mainly comprises a round disc. The round disc can cover the mouth. The round disc has a large outer diameter to suit different calibers of the mouth. However, when the round disc is fitted outside the container and when the container is filled with air, the air inside the container will form a force to push the round disc outward, resulting in ineffective air-tightness between the round disc and the mouth, and ineffective blocking to prevent the air from leaking through the mouth.

BRIEF SUMMARY OF THE INVENTION

The main object of the invention is provide a self-adaptive air bag blocking device, which can be applied to containers of different specifications, and which features easy operation and longer service life.

Based on the above object, the technical feature of the invention to solve the above-mentioned problems mainly lies in that, the self-adaptive air bag blocking device comprises an air bag. The air bag is made of an elastic material, and the inside of the air bag is formed with an air chamber. The air bag has a first end and a second end. The first end and the second end are opposite each other along the axial direction of the air bag. The peripheral side of the air bag is formed with a ring-shaped abutting surface. The abutting surface is located between the first end and the second end, and the abutting surface encloses the air chamber. The outer diameter of the abutting surface reduces gradually along the direction from the first end to the second end, so that the abutting surface abuts against the mouth of a container.

A first gas conveying pipe is configured on the air bag. The first gas conveying pipe is communicated with the air chamber and the outside of the air bag, so that air is imported into the air chamber to inflate the air bag. The abutting surface is elastically deformed and abuts against the inner wall of the container to form air-tight connection.

A second gas conveying pipe is configured on the air bag. The abutting surface encloses the second gas conveying pipe, and the second gas conveying pipe goes through the first end and the second end and is extended out of the air bag, so that air can go through the second gas conveying pipe and enter the container, to discharge the working liquid.

A press plate is provided. The first gas conveying pipe is sleeved on the press plate, and the press plate is pressed against the first end, so as to form a support to the first end, and to enhance the air-tightness when the inflated air bag blocks the mouth.

The main efficacy and advantage of the invention is that an air bag is used for blocking mouths of different sizes, and therefore the invention can be applied to a plurality of containers of different specifications. When the air chamber is inflated, the abutting surface is tightly pressed against the inner wall. It features high blocking reliability, easy operation of blocking and unblocking. Moreover, the air bag will not be worn out easily, nor will contraction occur. Therefore, the air bag will have a longer service life.

DETAILED DESCRIPTION OF THE INVENTION

Figure 1:
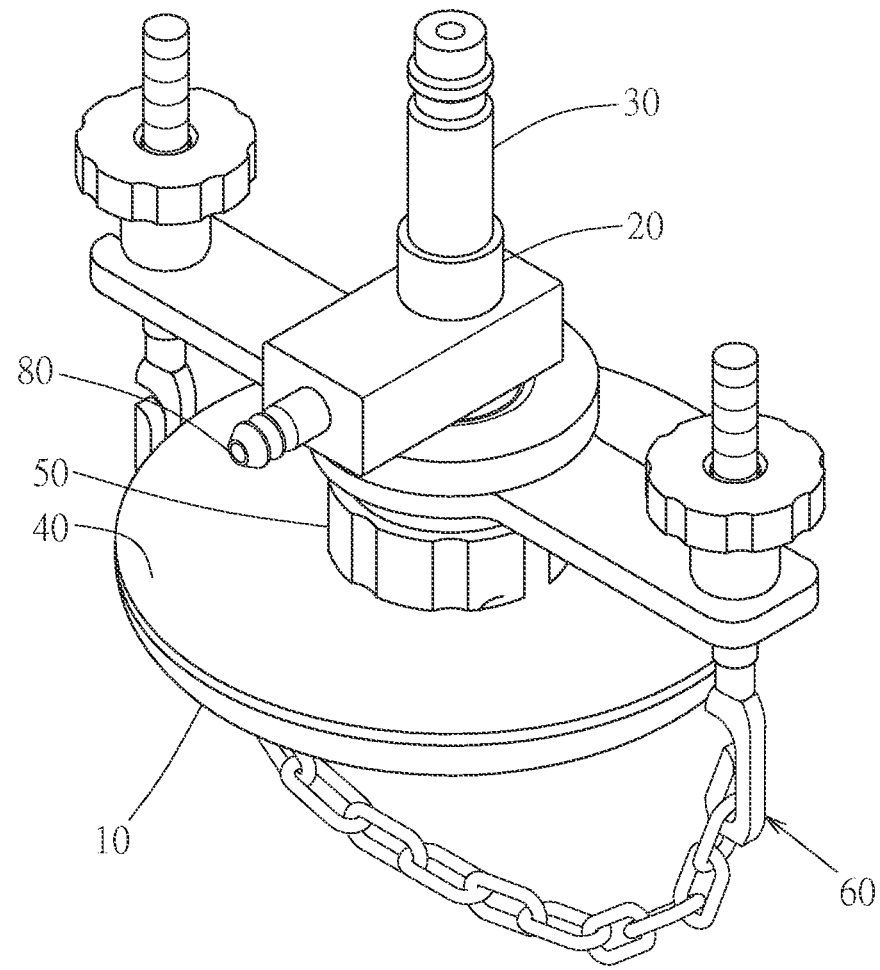
FIG. 1 is a perspective view of a preferred embodiment of the invention.
Figure 2:
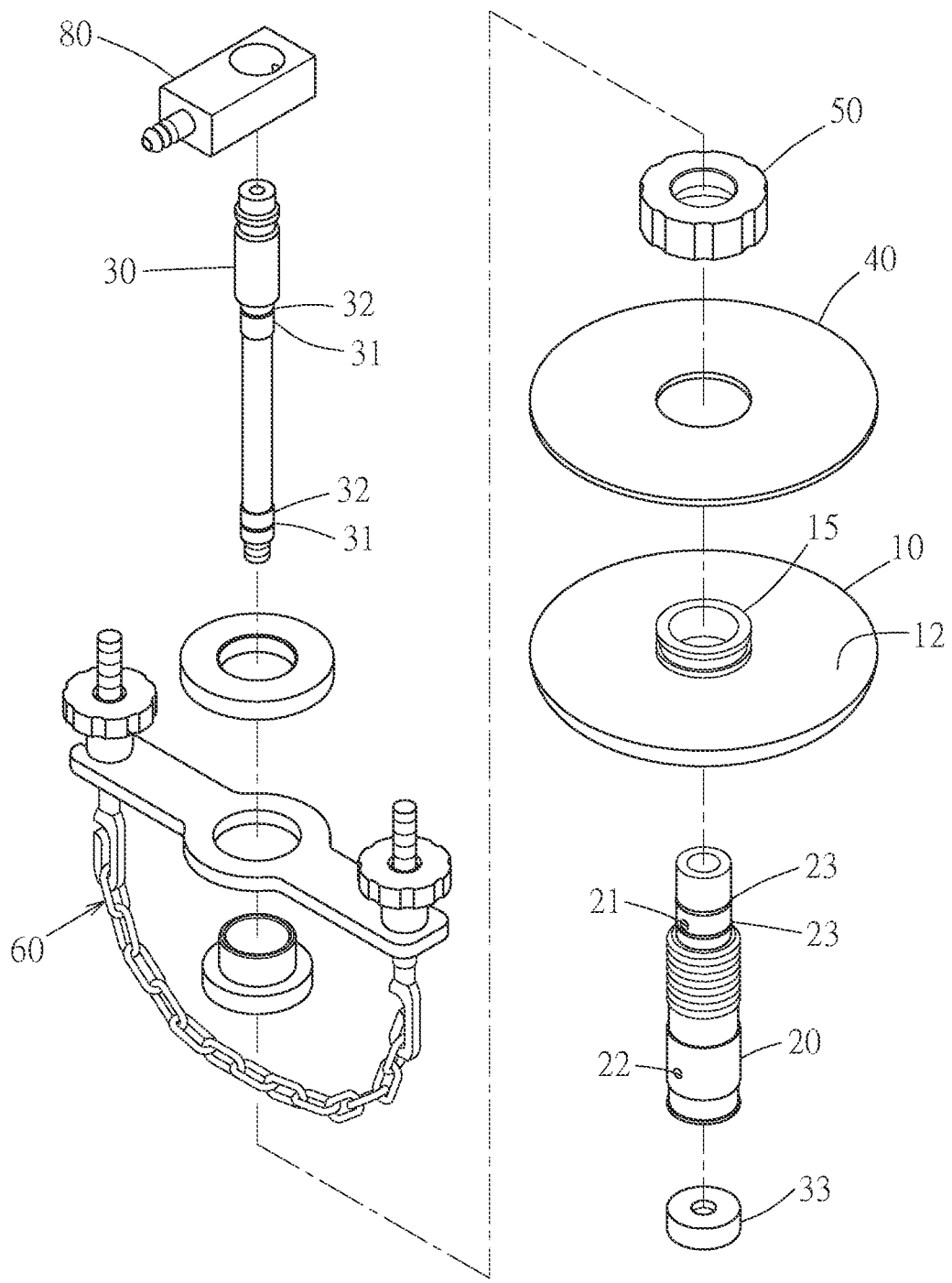
FIG. 2 is an exploded perspective view of a preferred embodiment of the invention.
Figure 3:
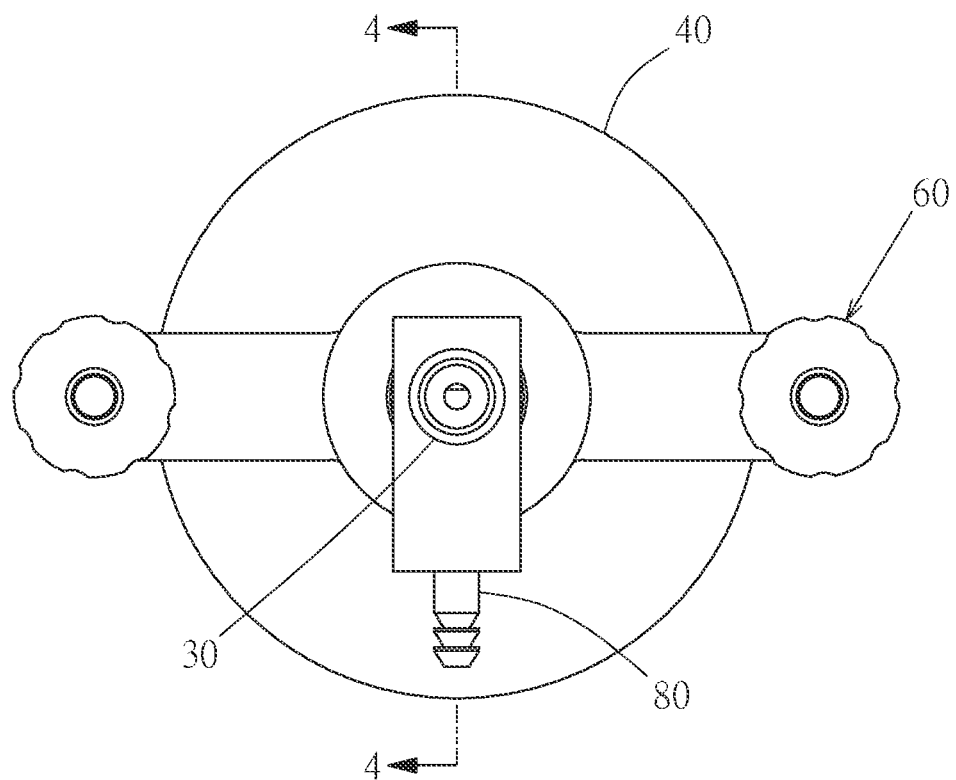
FIG. 3 is a top view of a preferred embodiment of the invention.
Figure 4:
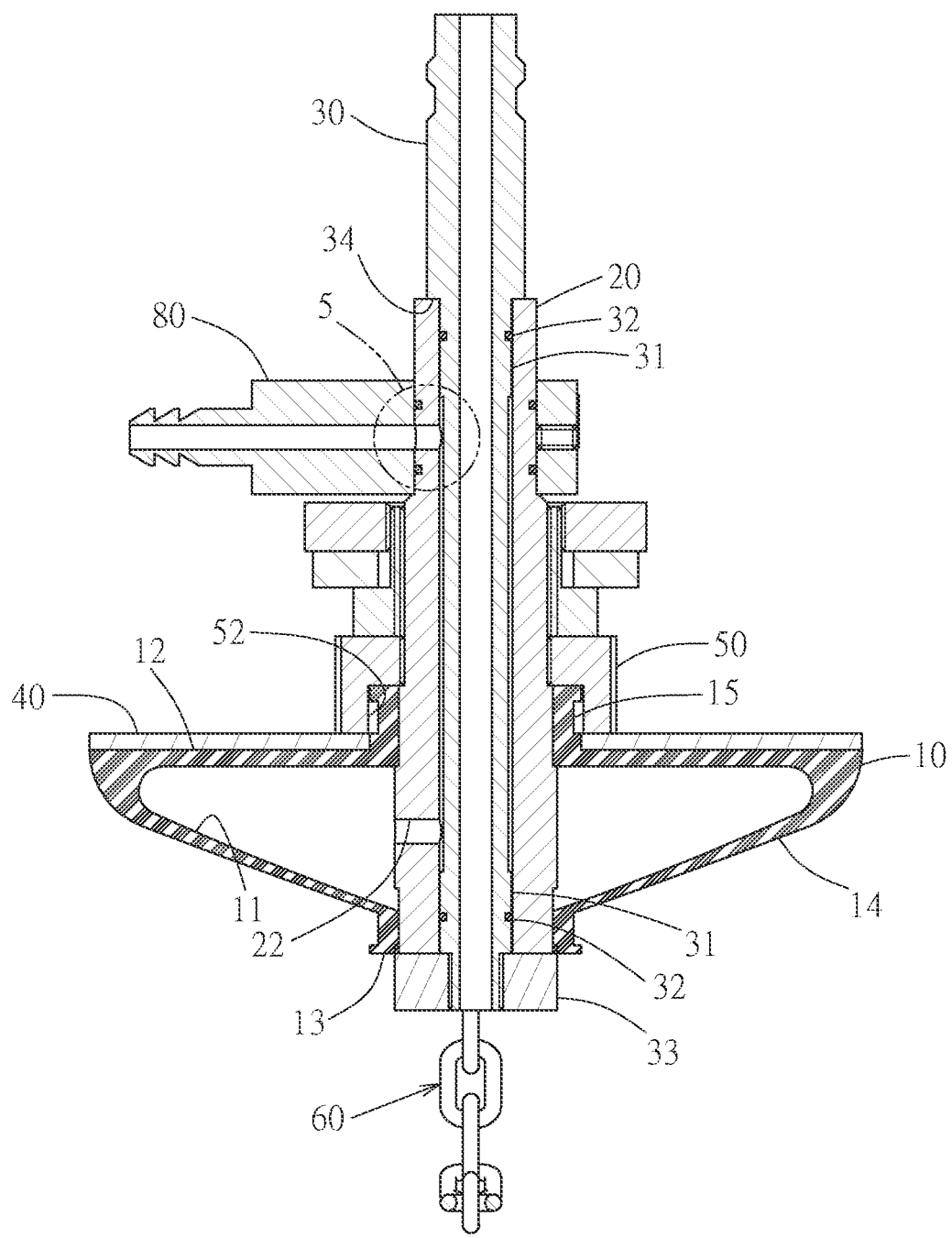
FIG. 4 is a 4-4 sectional view of FIG. 3.
Figure 5:
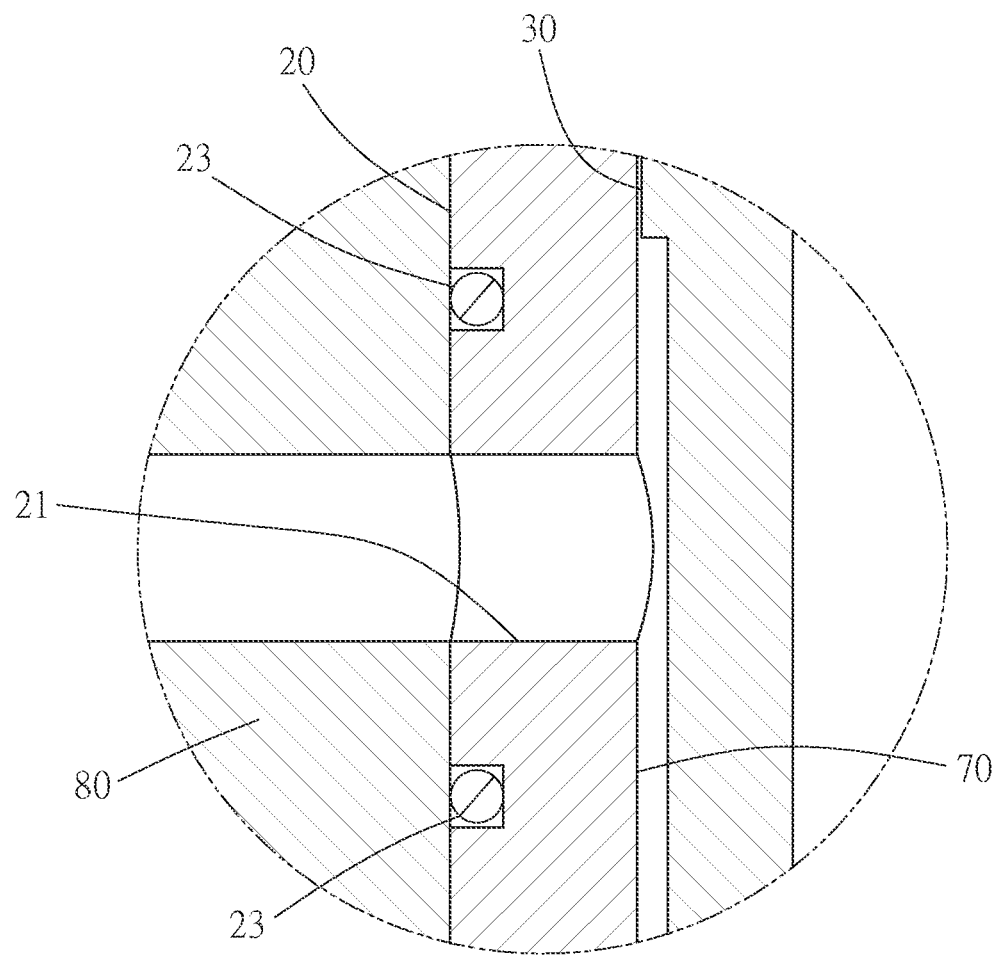
FIG. 5 is a partial enlarged view of FIG. 4.

FIG. 1 to FIG. 7 disclose a preferred embodiment of the self-adaptive air bag blocking device of the invention, which comprises an air bag 10, a first gas conveying pipe 20, a second gas conveying pipe 30 and a press plate 40. The air bag 10 is made of an elastic material, and the inside of the air bag 10 is formed with an air chamber 11. The air bag 10 has a first end 12 and a second end 13. The first end 12 and the second end 13 are opposite each other along the axial direction of the air bag 10. The peripheral side of the air bag 10 is formed with a ring-shaped abutting surface 14. The abutting surface 14 is located between the first end 12 and the second end 13, and the abutting surface 14 encloses the air chamber 11. The outer diameter of the abutting surface 14 reduces gradually along the direction from the first end 12 to the second end 13, so that the abutting surface 14 abuts against the mouth 92 of a container 90. The abutting surface 14 is a conical surface. Optionally, the abutting surface 14 can be a spherical cambered surface or in other shapes.

The first gas conveying pipe 20 is configured on the air bag 10. The first gas conveying pipe 20 is communicated with the air chamber 11 and the outside of the air bag 10, so that air is imported into the air chamber 11 to inflate the air bag 10. The abutting surface 14 is elastically deformed and abuts against the inner wall 94 of the container 90 to form air-tight connection. The first gas conveying pipe 20 is sleeved on the press plate 40, and the press plate 40 is pressed against the first end 12, so as to form a support to the first end 12, and to enhance the air-tightness when the inflated air bag 10 blocks the mouth 92.

The second gas conveying pipe 30 is configured on the air bag 10. The abutting surface 14 encloses the second gas conveying pipe 30. The second gas conveying pipe 30 goes through the first end 12 and the second end 13 and is extended out of the air bag 10, so that air can go through the second gas conveying pipe 30 into the container 90, to discharge the working liquid (not shown in the figure).

Figure 6:
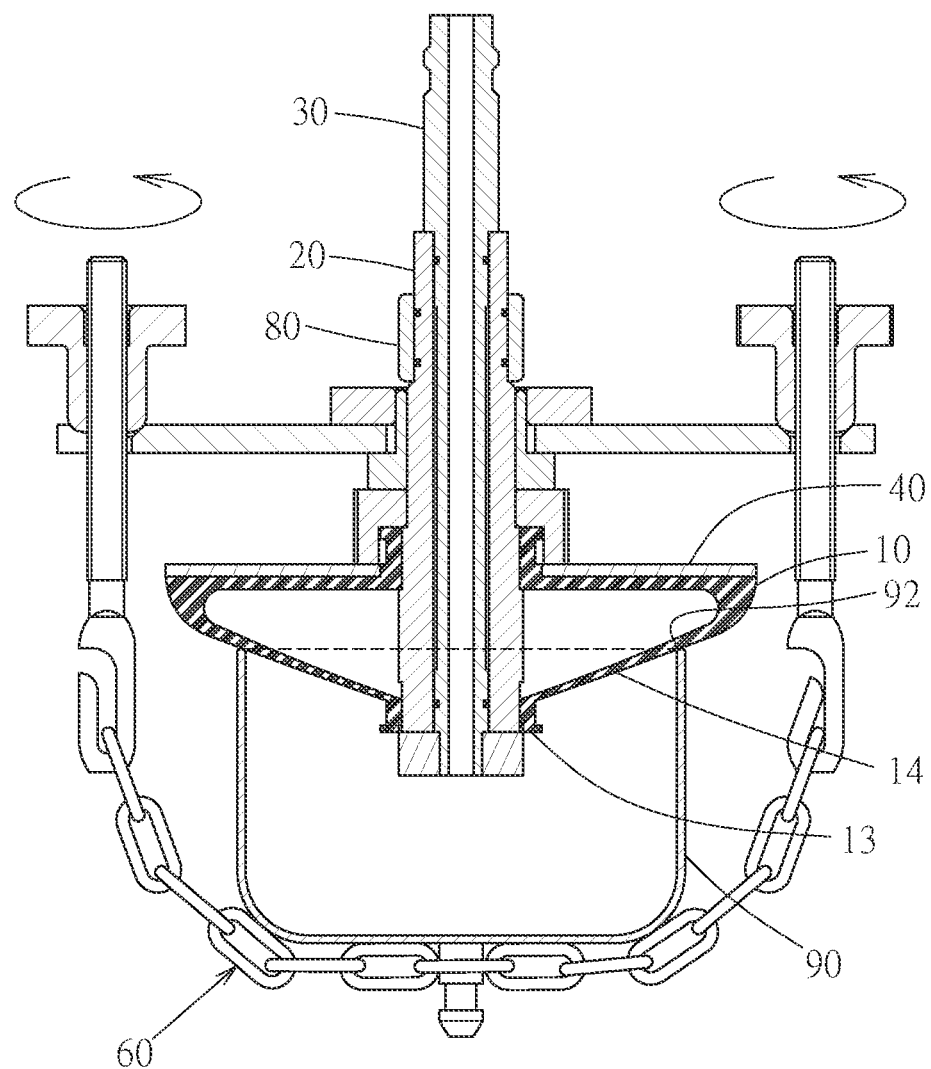
FIG. 6 is a sectional view (I) of the using state of a preferred embodiment of the invention.
Figure 7:
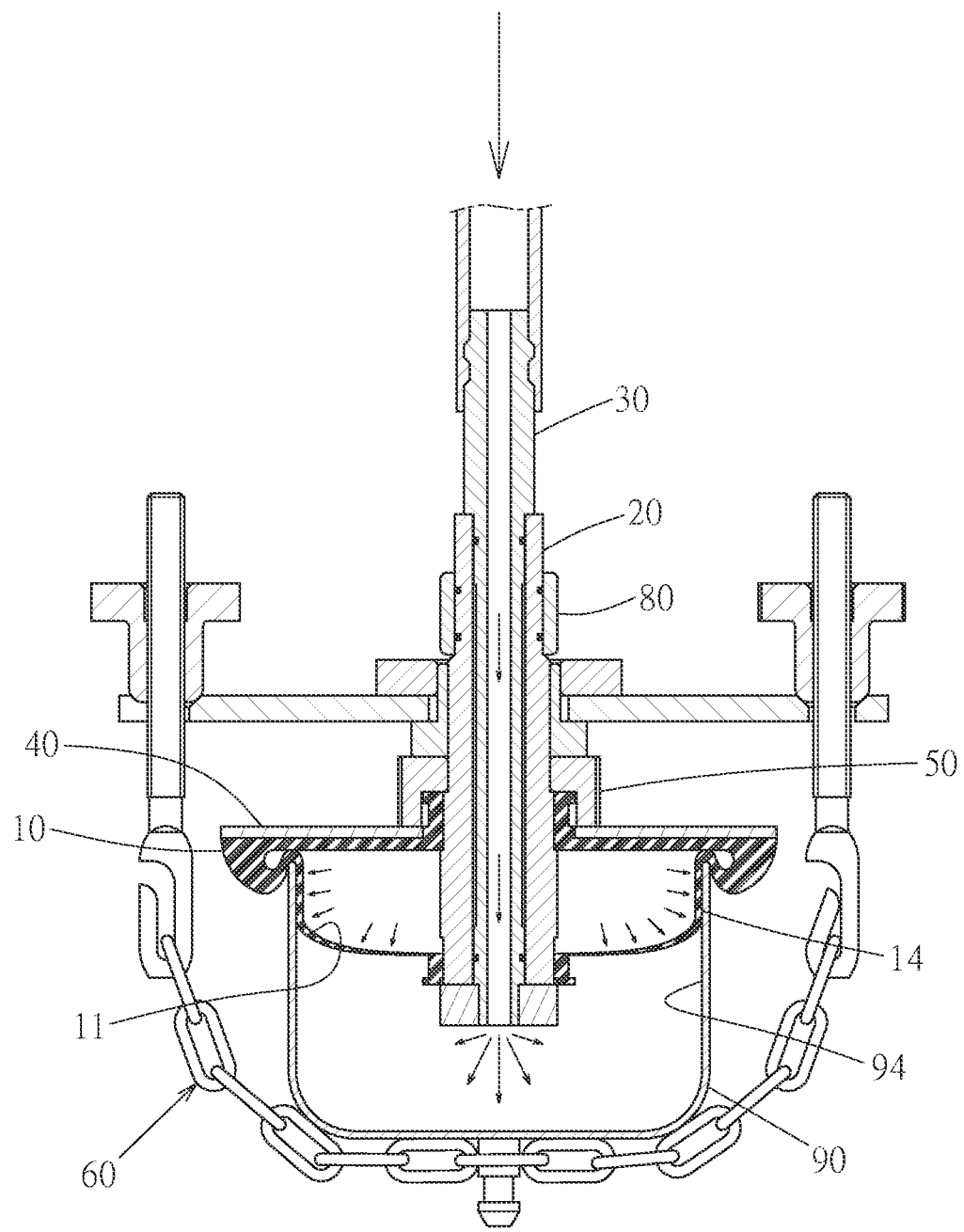
FIG. 7 is a sectional view (II) of the using state of a preferred embodiment of the invention.

Referring to FIG. 6, the air bag 10 abuts against the container 90, the abutting surface 14 abuts against the mouth 92, and the portion of the abutting surface 14 close to the second end 13 enters the container 90, and is opposite to the inner wall 94 in the lateral direction. Referring to FIG. 7, air can be imported into the air chamber 11 through the first gas conveying pipe 20. The air will inflate the air bag 10 and cause deformation. Now, the abutting surface 14 is deformed and abuts tightly against the inner wall 94. The press plate 40 forms a support to the first end 12, to prevent the air going into the air chamber 11 to press the first end 12 to deform toward the upper side of the figure. The air entering the air chamber 11 can effectively cause the abutting surface 14 to deform and abut tightly against the inner wall 94, so as to enhance the air-tightness when the air bag 10 blocks the mouth 92. After the air bag 10 blocks the mouth 92, air can be imported into the container 90 through the second gas conveying pipe 30, so that the air can press the working liquid and force the working liquid to be discharged to the outside.

Based on the structures of the air chamber 11 and the first gas conveying pipe 20, and the outer diameter of the abutting surface 14 reducing gradually from the first end 12 to the second end 13, the air bag 10 can be used to block mouths 92 of different sizes, and thus can be applied to a plurality of containers 90 of different specifications. When the air chamber 11 is inflated, the abutting surface 14 will be deformed and be tightly pressed against the inner wall 94. The surface contact between the abutting surface 14 and the inner wall 94 can form effective blocking with high blocking reliability. When it is needed to remove the air bag 10 from the mouth 92 and release the blocking, the operator just need to discharge the air inside the air chamber 11. The elasticity of the material of the air bag 10 will recover the abutting surface 14 to its original state, and the air bag 10 can be easily removed from the container 90. The operations of blocking and unblocking are very easy. Moreover, as the friction between the air bag 10 and the container 90 is minimal, the air bag 10 will not be worn out easily, nor will contraction occur. Therefore, the air bag 10 will have a longer service life.

As long as the air bag 10 is partly extended into the container 90, when air is imported into the air chamber 11 to inflate the air chamber 11, the abutting surface 14 will be tightly pressed against the inner wall 94 to form an effective blocking. Therefore, the air bag 10 can be applied to containers 90 with a narrow inner space, and it is suitable for a large range of sizes.

The preferred embodiment further comprises a fastener 50. The fastener 50 abuts against the side of the press plate 40 away from the first end 12. When the press plate 40 forms a support to the first end 12, the fastener 50 abuts against the press plate 40, further enhancing the effectiveness of the support by the press plate 40 to the first end 12.

The first gas conveying pipe 20 is in threaded connection with the fastener 50. Alternatively, other means can be used to connect the fastener 50 to the first gas conveying pipe 20.

Based on the connection between the first gas conveying pipe 20 and the fastener 50, the fastener 50 is formed with an indentation 52 on the side facing the press plate 40. The first end 12 is extended with a tube portion 15. The tube portion 15 goes through the press plate 40 and into the indentation 52.

The preferred embodiment further comprises a restriction structure 60, wherein the restriction structure 60 is connected to the first gas conveying pipe 20. The restriction structure 60 is used to restrict the container 90. When the air bag 10 is fitted on the container 90, the restriction structure 60 forms a restriction to the container 90, the restriction structure 60 also forms a restriction to the air bag 10. When the air bag 10 is inflated and deformed, the air entering the air chamber 11 will form a pressure against the air bag 10, preventing the air bag 10 from falling apart from the mouth 92. Thus, the air bag 10 can provide good air-tightness. The abutting surface 14 will expand toward the inside of the container 90 and be tightly pressed against the inner wall 94 to form air-tight blocking. The restriction structure 60 is a prior art known by those skilled in the art and its structure is not detailed herein.

The second gas conveying pipe 30 is axially connected on the first gas conveying pipe 20. The second gas conveying pipe 30 has two air-tight connecting portions 31. Each air-tight connecting portion 31 is configured along the axial direction of the second gas conveying pipe 30. Each air-tight connecting portion 31 is respectively connected with the first gas conveying pipe 20 in an air-tight manner. An air passage 70 is formed inside the first gas conveying pipe 20, and the air passage 70 is located between the air-tight connecting portions 31. The air passage 70 encloses the peripheral side of the second gas conveying pipe 30 to form a ring shape. The first gas conveying pipe 20 is formed with a first air conveying port 21 and a second air conveying port 22. The first air conveying port 21 is communicated with the air passage 70 and the outside environment. The second air conveying port 22 is communicated with the air passage 70 and the air chamber 11. Thus, air can go through the first air conveying port 21, the second air conveying port 22 and the air passage 70 into or away from the air chamber 11.

Each air-tight connecting portion 31 is respectively sleeved with a first O-ring 32. Each first O-ring 32 is respectively pressed tightly against the first gas conveying pipe 20, so that each air-tight connecting portion 31 is respectively connected with the first gas conveying pipe 20 in an air-tight manner, to prevent air from going through the gap between the first gas conveying pipe 20 and the second gas conveying pipe 30 and leaking outward.

The second gas conveying pipe 30 is provided with a stopping piece 33, the second gas conveying pipe 30 is formed with a ring-shaped limiting surface 34, the stopping piece 33 and the limiting surface 34 relatively limit the first gas conveying pipe 20, so as to relatively position the first gas conveying pipe 20 and the second gas conveying pipe 30; the stopping piece 33 optionally abuts against the second end 13, so as to relatively position the air bag 10 and the second gas conveying pipe 30; the stopping piece 33 is in threaded connection with the second gas conveying pipe 30.

The preferred embodiment further comprises a connecting pipe 80, wherein the connecting pipe 80 is configured on the first gas conveying pipe 20, and the connecting pipe 80 is communicated with the first gas conveying pipe 20, so that an external pipe (not shown in the figure) can be connected to the connecting pipe 80, to guide air into or away from the air chamber 11; the first gas conveying pipe 20 is optionally sleeved with a plurality of second O-rings 23, each second O-ring 23 is respectively pressed tightly against the connecting pipe 80, so that the first gas conveying pipe 20 and the connecting pipe 80 are connected in an air-tight manner.

I claim:

1. A self-adaptive air bag blocking apparatus comprising:
an air bag formed of an elastic material, said air bag having an air chamber formed therein, said air bag having a first end and a second end opposite to each other, said air bag having a peripheral side with a ring-shaped abutting surface, the ring-shaped abutting surface formed between the first end and the second end, the ring-shaped abutting surface enclosing the air chamber, the ring-shaped abutting surface having an outer diameter that reduces along a direction from the first end to the second end such that the ring-shaped abutting surface abuts a mouth of a container;
a first gas conveying pipe positioned on said air bag, said first gas conveying pipe communicating with the air chamber and an exterior of said air bag and adapted so as to allow air to enter the air chamber to inflate said air bag, the ring-shaped abutting surface being elastically deformable so as to abut against an inner wall of the container in an air-tight manner;
a second gas conveying pipe positioned on said air bag, said second gas conveying pipe being enclosed by the ring-shaped abutting surface, said second gas conveying pipe extending through the first end and the second end of said air bag and outwardly of said air bag such that air passes through said second gas conveying pipe and into the container in order to discharge a working fluid; and
a press plate having said first gas conveying pipe sleeved thereon, said press plate bearing against the first end of said air bag so as to form a support for the first end of said air bag and adapted to enhance an air-tightness when said air bag is inflated against the mouth of the container, wherein said second gas conveying pipe is axially connected on said first gas conveying pipe, said second gas conveying pipe having a pair of air-tight connecting portions, each air-tight connecting portion of the pair of air-tight connecting portions being configured along said second gas conveying pipe, each air-tight connecting portion of the pair of air-tight connecting portions being respectively connected to said first gas conveying pipe in an air-tight manner, said first gas conveying pipe having an air passage formed therein, the air passage positioned between the pair of air-tight connecting portions, wherein said first gas conveying pipe has a first air conveying port and a second air conveying port, the first air conveying port communicating with the air passage and an exterior environment, the second air conveying port communicating with the air passage and the air chamber such that air passes through the first air conveying port and the second air conveying port and the air passage into or away from the air chamber.

2. A self-adaptive air bag blocking apparatus comprising:
an air bag formed of an elastic material, said air bag having an air chamber formed therein, said air bag having a first end and a second end opposite to each, said air bag having a peripheral side with a ring-shaped abutting surface, the ring-shaped abutting surface formed between the first end and the second end, the ring-shaped abutting surface enclosing the air chamber, the ring-shaped abutting surface having an outer diameter that reduces along a direction from the first end to the second end such that the ring-shaped abutting surface abuts a mouth of a container;
a first gas conveying pipe positioned on said air bag, said first gas conveying pipe communicating with the air chamber and an exterior of said air bag and adapted so as to allow air to enter the air chamber to inflate said air bag, the ring-shaped abutting surface being elastically deformable so as to abut against an inner wall of the container in an air-tight manner;
a second gas conveying pipe positioned on said air bag, said second gas conveying pipe being enclosed by the ring-shaped abutting surface, said second gas conveying pipe extending through the first end and the second end of said air bag and outwardly of said air bag such that air passes through said second gas conveying pipe and into the container in order to discharge a working fluid; and
a press plate having said first gas conveying pipe sleeved thereon, said press plate bearing against the first end of said air bag so as to form a support for the first end of said air bag and adapted to enhance an air-tightness when said air bag is inflated against the mouth of the container, wherein said second gas conveying pipe has a stopping piece, said second gas conveying pipe having a ring-shaped limiting surface, wherein the stopping piece and the limiting surface relatively cooperative with said first gas conveying pipe so as to relatively position said first gas conveying pipe and said second gas conveying pipe.

3. The self-adaptive air bag blocking apparatus of claim 2, wherein the stopping piece abut the second end of said air bag so as to relatively position said air bag and said second gas conveying pipe.

4. The self-adaptive air bag blocking apparatus of claim 3, wherein said stopping piece is in threaded connection with said second gas conveying pipe.

5. The self-adaptive air bag blocking apparatus of claim 2, wherein said stopping piece is in threaded connection with said second gas conveying pipe.

6. The self-adaptive air bag blocking apparatus of claim 2, wherein said fastener has an indentation on a side facing said press plate, the first end of said air bag having a tube portion, the tube portion extending through said press plate and into the indentation of said fastener.

7. A self-adaptive air bag blocking apparatus comprising:
- an air bag formed of an elastic material, said air bag having an air chamber formed therein, said air bag having a first end and a second end opposite to each, said air bag having a peripheral side with a ring-shaped abutting surface, the ring-shaped abutting surface formed between the first end and the second end, the ring-shaped abutting surface enclosing the air chamber, the ring-shaped abutting surface having an outer diameter that reduces along a direction from the first end to the second end such that the ring-shaped abutting surface abuts a mouth of a container;
- a first gas conveying pipe positioned on said air bag, said first gas conveying pipe communicating with the air chamber and an exterior of said air bag and adapted so as to allow air to enter the air chamber to inflate said air bag, the ring-shaped abutting surface being elastically deformable so as to abut against an inner wall of the container in an air-tight manner;
- a second gas conveying pipe positioned on said air bag, said second gas conveying pipe being enclosed by the ring-shaped abutting surface, said second gas conveying pipe extending through the first end and the second end of said air bag and outwardly of said air bag such that air passes through said second gas conveying pipe and into the container in order to discharge a working fluid; and
- a press plate having said first gas conveying pipe sleeved thereon, said press plate bearing against the first end of said air bag so as to form a support for the first end of said air bag and adapted to enhance an air-tightness when said air bag is inflated against the mouth of the container; and
- a fastener abutting a side of said press plate away from the first end of said air bag, said fastener being in threaded connection with said first gas conveying pipe.

* * * * *